United States Patent
Kleppe et al.

(10) Patent No.: US 11,954,831 B2
(45) Date of Patent: Apr. 9, 2024

(54) METHOD OF IMAGE EVALUATION FOR SIM MICROSCOPY AND SIM MICROSCOPY METHOD

(71) Applicant: Carl Zeiss Microscopy GmbH, Jena (DE)

(72) Inventors: Ingo Kleppe, Jena (DE); Yauheni Novikau, Apolda (DE); Lutz Schaefer, Kitchener (CA)

(73) Assignee: Carl Zeiss Microscopy GmbH, Jena (DE)

( * ) Notice: Subject to any disclaimer, the term of this patent is extended or adjusted under 35 U.S.C. 154(b) by 442 days.

(21) Appl. No.: 17/467,912

(22) Filed: Sep. 7, 2021

(65) Prior Publication Data

US 2022/0092752 A1 Mar. 24, 2022

(30) Foreign Application Priority Data

Sep. 10, 2020 (DE) ..................... 10 2020 123668.9

(51) Int. Cl.
*G06T 5/20* (2006.01)
*G01B 11/25* (2006.01)
(Continued)

(52) U.S. Cl.
CPC ................ *G06T 5/20* (2013.01); *G01B 11/25* (2013.01); *G02B 21/06* (2013.01); *G02B 21/367* (2013.01);
(Continued)

(58) Field of Classification Search
None
See application file for complete search history.

(56) References Cited

U.S. PATENT DOCUMENTS 10,684,458 B2 * 6/2020 Chung ............... G02B 27/0025
11,226,293 B1 * 1/2022 Feng .................... G01N 21/958
(Continued)

FOREIGN PATENT DOCUMENTS

| DE | 102018009056 A1 | 5/2020 | |
| WO | 2013049646 A1 | 4/2013 | |
| WO | WO-2021099127 A1 * | 5/2021 | ....... A61B 1/000094 |

OTHER PUBLICATIONS

Lal A, Shan C, Xi P. Structured illumination microscopy image reconstruction algorithm. IEEE Journal of Selected Topics in Quantum Electronics. Feb. 8, 2016;22(4):50-63. (Year: 2016).*

(Continued)

*Primary Examiner* — Emily C Terrell
*Assistant Examiner* — Nathan J Bloom
(74) *Attorney, Agent, or Firm* — Duane Morris LLP (57) ABSTRACT

A method of image evaluation when performing SIM microscopy on a sample includes: A) providing n raw images of the sample, which were each generated by illuminating the sample with an individually positioned SIM illumination pattern and imaging the sample in accordance with a point spread function, B) providing (S1) n illumination pattern functions, which each describe one of the individually positioned SIM illumination patterns, C) providing (S1) the point spread function and D) Carrying out an iteration method, which includes following iteration steps a) to e), as follows: a) providing an estimated image of the sample, b) generating simulated raw images, in each case by image processing of the estimated image using the point spread function and one of the n illumination pattern functions such that n simulated raw images are obtained, c) assigning each of the n simulated raw images to that of the n provided raw images which was generated by the illumination pattern that corresponds to the illumination pattern function used to generate the simulated raw image, and (Continued)

calculating n correction raw images by the comparison of each provided raw image with the simulated raw image assigned thereto, d) generating a correction image by combining image processing of the n correction raw images using the point spread function and the n illumination pattern functions, wherein a filtering step is carried out in each implementation of iteration step d), said filtering step suppressing a spatial fundamental frequency of the illumination pattern, and e) reconstructing the estimated image of the sample by means of the correction image and using the corrected estimated image of the sample as the estimated image of the sample in iteration step a) in the next run through the iteration.

13 Claims, 4 Drawing Sheets

(51) Int. Cl.
    *G02B 21/06*     (2006.01)
    *G02B 21/36*     (2006.01)
    *G06T 5/50*     (2006.01)
    *G06T 5/73*     (2024.01)
    *G06V 10/145*     (2022.01)
    *G06V 10/88*     (2022.01)
    *G06V 20/69*     (2022.01)

(52) U.S. Cl.
    CPC .................. *G06T 5/50* (2013.01); *G06T 5/73* (2024.01); *G06V 10/145* (2022.01); *G06V 10/89* (2022.01); *G06V 20/693* (2022.01); *G06V 20/698* (2022.01); *G06T 2207/10056* (2013.01); *G06T 2207/10064* (2013.01); *G06T 2207/10152* (2013.01)

(56) References Cited

U.S. PATENT DOCUMENTS

| | | | |
|---|---|---|---|
| 2014/0036057 A1* | 2/2014 | Hayashi | G02B 21/0032 348/79 |
| 2014/0313576 A1 | 10/2014 | Uhl et al. | |
| 2015/0212291 A1* | 7/2015 | Lee | H04N 23/687 348/360 |
| 2020/0150043 A1 | 5/2020 | Kleppe et al. | |
| 2020/0319446 A1* | 10/2020 | Georgiadis | G02B 21/0032 |
| 2021/0116380 A1* | 4/2021 | Ma | G06T 3/4053 |
| 2021/0118110 A1* | 4/2021 | Langlois | G01N 21/6428 |
| 2021/0325651 A1* | 10/2021 | Tsia | G02B 21/0032 |
| 2021/0383516 A1* | 12/2021 | Chen | G06T 3/4053 |
| 2022/0020116 A1* | 1/2022 | Siegel | G06T 3/4053 |
| 2022/0058776 A1* | 2/2022 | Ozcan | G06V 10/82 |
| 2022/0075175 A1* | 3/2022 | Kleppe | G02B 21/06 |
| 2022/0076067 A1* | 3/2022 | Marie-Nelly | G06V 10/774 |

OTHER PUBLICATIONS

Lukeš T, Hagen GM, Křížek P, Švindrych Z, Fliegel K, Klíma M. Comparison of image reconstruction methods for structured illumination microscopy. InBiophotonics: Photonic Solutions for Better Health Care IV May 8, 2014 (vol. 9129, pp. 607-619). SPIE. (Year: 2014).*
Neil, M., et al.; "Method of obtaining optical sectioning by using structured light in a conventional microscope"; Optics Letters 1997: 22(24):1905-1907.
Gustafsson, M., et al.; "Three-Dimensional Resolution Doubling in Wide-Field Fluorescence Microscopy by Structured Illumination"; Biophysical Journal 2008; 94:4957-4970.
Heintzmann, R., et al.; "Super-Resolution Structured Illumination Microscopy"; Chemical Reviews 2017; 117(23): 13890-13908.
Ströhl, F., et al.; "Frontiers in structured illumination microscopy"; Optica 2016; 3(6):667-677.
Schermelleh, L., et al.; "Super-resolution microscopy demystified"; Nature Cell Biology 2019; 21:72-84.
Heintzmann, R., et al.; "Saturated patterned excitation microscopy with two-dimensional excitation patterns"; Micron 2003; 34:283-291.
Schropp, M., et al.; "Two-dimensional structured illumination microscopy"; Journal of Microscopy 2014; 256(1):23-36.
Ingerman, E., et al.; "Signal, noise and resolution in linear and nonlinear structured-illumination microscopy"; Journal of Microscopy 2019; 273(1):3-25.
Guo, Y., et al.; "Visualizing Intracellular Organelle and Cytoskeletal Interactions at Nanoscale Resolution on Millisecond Timescales"; Cell 2018; 175:1430-1442.
Frohn, J., et al.; "True optical resolution beyond the Rayleigh limit achieved by standing wave illumination"; Proceedings of the National Academy of Sciences of the United States of America 2000; 97(13):7232-7236.
Siebenmorgen, A., et al.; "Introducing Lattice SIM for ZEISS Elyra 7—Structured Illumination Microscopy with a 3D Lattice for Live Cell Imaging", https://asset-downloads.zeiss.com/catalogs/download/mic/39039cc1-1e0d-4fdc-81c9-9d3d28966c66/EN_WP_Introducing_Lattice_SIM_for_Elyra-7.pdf, 2018; 1-7.
Zhang, Y., et al.; "Super-resolution algorithm based on Richardson-Lucy deconvolution for three-dimensional structured illumination microscopy"; J. Opt. Soc. Am. A 2019; 36:173-178.
Perez, V., et al.; "Optimal 2D-SIM reconstruction by two filtering steps with Richardson-Lucy deconvolution"; Scientific Reports 2016; 6:37149.
Sahl, S., et al.; "Comment on 'Extended-resolution structured illumination imaging of endocytic and cytoskeletal dynamics'"; Science 2016; 352(6285).
Li, D., et al.; "Response to Comment on 'Extended-resolution structured illumination imaging of endocytic and cytoskeletal dynamics'"; Science 2016; 352(6285).
Jin, L., et al.; "Deep learning enables structured illumination microscopy with low light levels and enhanced speed"; Nature Communications; 11(1):1934.
Cnossen, J., et al.; "Localization microscopy at doubled precision with patterned illumination"; Nature Methods 2020; 17(1):59-63.
Li, D., et al.; "Extended-resolution structured illumination imaging of endocytic and cytoskeletal dynamics"; Science 2015; 349(6251).
Bv, B.; "Huygens Professional User Guide" 2010; Im, 1-134; papers3://publication/uuid/7CCF1B64-BB04-41AE-B226-346E8D0F0CC9.
Chakrova, N., et al.; "Deconvolution methods for structured illumination microscopy"; Journal of the Optical Society of America A 2016; 33(7):B12.
Ströhl, F., et al.; "A joint Richardson-Lucy deconvolution algorithm for the reconstruction of multifocal structured illumination microscopy data"; Methods and Applications in Fluorescence 2015; 3(1), https://doi.org/10.1088/2050-6120/3/1/014002.
Pospíšil, J., et al.; "Imaging tissues and cells beyond the diffraction limit with structured illumination microscopy and Bayesian image reconstruction"; GigaScience 2018; 8(1):1-12; https://doi.org/10.1093/gigascience/giy126.
Bozinovic, N., et al.; "Fluorescence endomicroscopy with structured illumination"; Optics Express 2008; 16(11):8016-8025.
Karras, C., et al.; "Successful optimization of reconstruction parameters in structured illumination microscopy—A practical guide"; Optics Communications 2019; 436:69-75.
Wikipedia:Richardson-Lucy deconvolution; 1-3.
Sandemeyer, Alice; "Dissertation—Compact Realizations of Optical Super-Resolution Microscopy for the Life Sciences"; Bielefeld University, Faculty of Physics 2019; 1-166.

* cited by examiner

METHOD OF IMAGE EVALUATION FOR SIM MICROSCOPY AND SIM MICROSCOPY METHOD

RELATED APPLICATIONS

The present application claims priority benefit of German Application No. DE 10 2020 123 668.9 filed on Sep. 10, 2020, the contents of which are incorporated by reference in their entirety.

FIELD OF THE INVENTION

The invention relates to a method of image evaluation when performing SIM microscopy on a sample, and to an SIM microscopy method utilizing the corresponding image evaluation method.

BACKGROUND OF THE INVENTION

The so-called "structured illumination microscopy" technique has proven its worth as a microscopic imaging method. It can essentially be traced back to the publications [1] M. Neil et al.: "Method of obtaining optical sectioning by using structured light in a conventional microscope", Optics Letters 22, 1905-1907 (1997), https.//doi.org/10.1364/OL.22.001905, and [2] M. Gustafsson et al.: "Three-Dimensional Resolution Doubling in Wide-Field Fluorescence Microscopy by Structured Illumination", Biophysical Journal 94, 4957-4970 (2008), and provides for an illumination of the sample using an SIM illumination pattern. The sample is imaged repeatedly, with the illumination pattern being brought into various positions relative to the sample and a so-called raw image is obtained for each of the illumination states realized thus. These raw images are then combined in an image processing process in order to obtain an image of the sample that is improved in respect of the resolution, in particular in respect of the depth resolution, in relation to normal wide field imaging by the same microscope.

SIM illumination patterns are regular. The individually positioned SIM illumination patterns thus do not differ in their basic structure, which is identical in each case, but in terms of their relative position with respect to the sample during wide field imaging. The SIM illumination pattern is often generated from an initial beam by way of a grating which diffracts the initial beam into a plurality of orders of diffraction, which as partial beams capable of interfering with one another are arranged in an illumination pupil of an illumination beam path. Then, the SIM illumination pattern arises in the sample as an interference pattern. It contains a countable set of discrete spatial illumination pattern frequencies, with the number arising from the combination possibilities of the partial beams (cf. FIG. 2 in [2]). It is not unusual in this context to talk about orders of diffraction when the discrete, spatial illumination pattern frequencies in the frequency domain are meant. Nevertheless, the terminology in the specialist literature is sadly not uniform. The term order of diffraction is understandable if the (albeit only optional) generation of the illumination pattern by interference is considered since a diffraction effect occurs in this case. The spatial illumination pattern frequencies then correspond to the absolute value of the complex conjugate frequencies of orders of diffraction. However, the term order of diffraction has nothing to do with a (likewise optional) upstream generation of the partial beams by diffraction at a grating.

A plurality of raw images are recorded at individually positioned SIM illumination patterns. The raw images contain a moiré pattern with the higher frequencies of the sample information. Consequently, a special image evaluation is required for the SIM microscopy technique in order to obtain the image of the sample from the moiré pattern of the raw images. The prior art considers the image evaluation, based on already existing raw images, in many different ways. In particular, the following publications should be mentioned:

[3] R. Huntsman and T. Huser: "Super-Resolution Structured Illumination Microscopy". Chemical Reviews 117 (23), 13890-13908 (2017);

[4] F. Ströhl and C. Kaminski: "Frontiers in structured illumination microscopy", Optica 3, 667-677 (2016);

[5] L. Schermelleh et al.: "Super-resolution microscopy demystified", Nature Cell Biology 21, 72-84 (2019):

[6] R. Heintzmann: "Saturated patterned excitation microscopy with two-dimensional excitation patterns", Micron 34 (6-7), 283-291 (2003);

[7] M. Schropp and R. Uhl: "Two-dimensional structured illumination microscopy, Journal of Microscopy 256, 23-36 (2014);

[8] E. Ingerman et al.: "Signal, noise and resolution in linear and non-linear structured-illumination microscopy", Journal of Microscopy 273, 3-25 (2019);

[9] Y. Guo et al.: "Visualizing Intracellular Organelle and Cytoskeletal Interactions at Nanoscale Resolution on Millisecond Timescales", Cell 175, 1430-1442;

[10] J. Frohn et al.: "True optical resolution beyond the Rayleigh limit achieved by standing wave illumination", Proceedings of the National Academy of Sciences of the United States of America 97, 7232-7236 (2000);

[11] A. Siebenmorgen and Y. Novikau: "Introducing Lattice SIM for ZEISS Elyra 7—Structured Illumination Microscopy with a 3D Lattice for Live Cell Imaging", https://asset-downloads.zeiss.com/catalogs/download/mic/39039ec1-le0d-4fdc-81c9-9d3d28966c66/EN_WP_Introducing_Lattice_SIM_for_Elyra-7.pdf, (2018), 1-7;

[12] WO 2013/049646 A1:

[13] DE 102018009056 A1;

[14] Y. Zhang et al.: "Super-resolution algorithm based on Richardson-Lucy deconvolution for three-dimensional structured illumination microscopy", J. Opt. Soc. Am. A 36, 173-178 (2019):

[15] V. Perez et al.: "Optimal 2D-SIM reconstruction by two filtering steps with Richardson-Lucy deconvolution", Sci Rep 6, 37149 (2016);

[16] S. Sahl et al.: "Comment on 'Extended-resolution structured illumination imaging of endocytic and cytoskeletal dynamics'", Science (80), 352, 527 (2016);

[17] D. Li and E. Betzig. "Response to Comment on 'Extended-resolution structured illumination imaging of endocytic and cytoskeletal dynamics'". Science (80), 352, 527 (2016);

[18] L. Jin et al.: "Deep learning enables structured illumination microscopy with low light levels and enhanced speed", Nature Communications, 11(1), 1934;

[19] J. Cnossen et al.: "Localization microscopy at doubled precision with patterned illumination. Nature Methods, 17(1), 59-63, 2020;

[20] D. Li et al.: "Extended-resolution structured illumination imaging of endocytic and cytoskeletal dynamics", Science, 349(6251), 2015:

[21] S. By (2010): "Huygens Professional User Guide", Im, 1-134, papers3://publication/uuid/7CCF1B64-BB04-41AE-B226-346E8D0F0CC9;

[22] N. Chakrova et al.: "Deconvolution methods for structured illumination microscopy", Journal of the Optical Society of America A, 33(7), B12 (2016);

[23] F. Ströhl, et al.: "A joint Richardson-Lucy deconvolution algorithm for the reconstruction of multifocal structured illumination microscopy data", Methods and Applications in Fluorescence, 3(1), https://doi.org/10.1088/2050-6120/3/1/014002, (2015);

[24] J. Pospíšil, et al.: "Imaging tissues and cells beyond the diffraction limit with structured illumination microscopy and Bayesian image reconstruction", GigaScience, 8(1), 1-12, https://doi.org/10.1093/gigascience/giy126, (2018).

Conventionally (cf. [2]), the following steps No. 1 to 5 are carried out algorithmically for image evaluation of the raw images:

1. Extracting the frequency ranges containing sample information. To this end, the moiré pattern present in the raw images is decoded by solving a linear system of equations.

2. Determining the phase angle and spatial illumination pattern frequencies from the raw images to minimize artifacts from the combination by calculation.

3. Filtering the frequency for suppressing spatial illumination pattern frequencies and, in particular, partly significant and low-frequency background which reaches higher frequencies as a result of a shift and leads to artifacts in the sample there.

4. Shifting the regions extracted in the first step to the corresponding positions in the frequency domain in order to be able to put together the high-resolution image. This is implemented by:

5. Combining the regions in a common step which contains the following:
   a. A weighted summation with
      i. weights of the illumination which originate from different illumination intensity levels of the individual illumination pattern frequencies and
      ii. weights derived from the optical transfer function (OTF),
   b. Use of a generalized Wiener filter to smooth the composition, in particular at the inner edges of the frequency bands,
   c. Utilization of an apodization function to suppress ringing artifacts produced by the Wiener filter.

The apodization function usually is adjustable in empirical fashion in order to improve the image evaluation during the reconstruction and avoid artifacts. Therefore, the SIM image evaluation also depends substantially on the utilized apodization function and the interpretation of the images is sometimes very contentious (see, e.g., [16], [17]).

In addition to this conventional reconstruction process and sub-variants thereof, further processes, some of which are fundamentally different, for reconstructing SIM raw images have been published in recent years ([14], [15], [18], [22]-[24]).

Thus, [14], [15], [22]-[24] replace the Wiener filter utilized in No. 5b with iterative deconvolutions to minimize artifacts. Richardson-Lucy iteration methods and maximum likelihood estimation methods have been proposed.

In this case. Zhang et al. ([14]), who describe a generic method for the invention, likewise follow steps 1 to 4 of the conventional algorithm, but use a different variant for combining the regions. These are initially combined without OTF weighting (5.a.ii), but only with weights originating from the illuminance (5.a.i), and subsequently assembled by a known Richardson-Lucy deconvolution.

Perez et al. ([15]), who likewise use a Richardson-Lucy deconvolution, albeit only in 2-D, instead of the Wiener filter still place a first deconvolution before the entire processing in order to determine the phase angle and actual grating frequency (see No. 2) more accurately and thereby reduce artifacts. Here, too, the Richardson-Lucy deconvolution is then subsequently carried out. This reconstruction claims to be more robust and claims not to require an adaptation of the parameters. This method achieves an increase in the resolution of significantly above two, which is not possible in conventional wide field imaging with the utilized objectives. However, the results are in line with SIM measurements in combination with TIRF, in which work has to be carried out with objectives with very high numerical aperture values and similarly fine illumination frequencies are used.

Only very few iterations of the Richardson-Lucy deconvolution can be used in the two publications [14], [15], specifically three [14] and no more than five [15]. This restricts the resolution, which increases with the number of iterations in the case of the Richardson-Lucy deconvolution. This number of iterations is very much smaller than otherwise conventional with methods of this type ([21]). For an optimal resolution, maximum likelihood estimation methods, for example, usually use significantly more iterations, e.g., 40 or more ([21]), or the algorithm should have converged so far that a few iterations do not significantly alter the result. As the main reason for the restriction, Zhang et al. specify a "noise amplification problem" of the Richardson-Lucy deconvolution. Additionally, the first deconvolution step intended to significantly reduce the noise, as is introduced by Perez et al., is not suitable for attaining significantly more iterations and hence a better resolution.

A further approach as per [22]-[24], albeit only in 2-D, does not use the conventional step No. 1 of separating the orders and does not use the aforementioned step No. 3 of suppressing the grating frequencies/out-of-focus information either, but instead makes use of the fact that the iterative methods can also directly fit the individual phase images with the corresponding illumination pattern as a so-called Joint-Richardson-Lucy deconvolution.

Here, the problem of the out-of-focus background and the grating artifacts, which are conventionally suppressed in step No. 3, has not been rectified, as described in [24]. The authors propose to suppress the out-of-focus background following the iterative deconvolution.

Another, likewise completely different reconstruction method draws on the use of neural networks with so-called deep learning (cf. [18]). However, in principle, this method is an interpretation of the measured data, which feeds from "experiences" which the network has made with the training data records, i.e., already interpreted data records. This is hardly possible for scientific measurement since an already interpreted data record is usually not available or the transferability to other measurements is questionable.

A disadvantage of all the aforementioned approaches is that regions in the sample with significant fluorescence in out-of-focus regions. i.e., in sample regions located above or below the focal plane from which the raw images were imaged, generally exhibit significant deconvolution artifacts. This impairs the interpretation of the data or requires smoothing processes which destroy the increase in resolution. This problem is discussed in citations [20], [16] and [17], in particular. On account of these circumstances, the increase in resolution achievable in practice is significantly below what would be theoretically possible.

SUMMARY OF THE INVENTION

The invention is based on the object of improving the image evaluation of raw images after carrying out SIM microscopy in order to increase the achievable resolution.

The invention is defined in the independent claims. The dependent claims relate to preferred configurations.

The invention provides improved image evaluation of raw images, which may originate from the SIM microscopy technique, for example. However, these can also be simulated raw images, for example to test or compare evaluation algorithms, in order to evaluate test samples or in order to educate users of SIM microscopes. Although the invention builds on raw images, the generation of the raw images is not a constituent part of the image evaluation method. Rather, it is completely sufficient to have raw images available that were generated differently by microscopy or simulation, which raw images are a plurality of image representations of the same sample according to a point spread function, wherein the sample was illuminated in each image representation by an individually positioned SIM illumination pattern, either in practice or in the simulation, or wherein said sample was excited to emit in the case of fluorescence microscopy.

The individually positioned SIM illumination patterns, which are consequently individual relative positions or positions of one and the same basic pattern, are definable in the form of illumination pattern functions. Each illumination pattern function describes the underlying SIM illumination pattern in its individual position. In particular, the illumination pattern functions only differ in the value of a variable that influences the position. The illumination pattern functions are either provided from an external source, for example within the scope of a simulation or during the preceding specification of the SIM microscopy imaging, or are ascertained from the n raw images. Further, finally, the point spread function is known and provided accordingly—either in the spatial domain as a so-called PSF and/or in the Fourier domain as a so-called OTF (optical transfer function). These are steps A)-C) of the method.

From a signaling point of view, the spatial frequencies of the illumination pattern serve in SIM microscopy as carrier frequencies on which the SIM microscopy modulates the frequency spectrum representing the sample information. As a result, a frequency spectrum of the sample (and ultimately a resolution) can be imaged by the optical unit, which is actually located outside of the range transmissible by said optical unit. This frequency spectrum is separated from the plurality of carrier frequencies again using the method for image evaluation.

On the basis of the specifications provided, an iteration is carried out in the method of image evaluation in a step D) which comprises a plurality of iteration steps a) to e), wherein a run through iteration steps a) to e) represents a loop of the iteration method. The start of each loop of the iteration method is the provision of an estimated image of the sample (iteration step a). This estimated image of the sample can be a uniform grayscale image of the sample in the first iteration of the loop of the iteration method. Further knowledge is not required since the iteration method already converges starting from such a completely unstructured estimated image of the sample. The estimated image develops to the image of the sample in the iteration method.

In the iteration method, simulated raw images are generated from the estimated image of the sample in an iteration step b). This is implemented by suitable n-time image processing of the estimated image of the sample, in each case using the point spread function and a single one of the n illumination functions. The iteration step b) therefore represents computational simulation of the raw image generation or simulated imaging starting from the estimated image as a sample. Since the illumination pattern functions utilized are assigned to the actual raw images, the number of simulated raw images arising in iteration step b) is the same as the number of provided raw images and illumination functions, namely a total of n.

Subsequently, the n simulated raw images are assigned to the n provided raw images in an iteration step c). This assignment is implemented on the basis of the illumination pattern functions, i.e., pairs of simulated raw images and provided raw images are formed, wherein the elements of each pair have the same illumination pattern function. After these pairs were formed, n correction raw images are calculated within the n pairs by virtue of the provided raw image being compared in each case to the simulated raw image of the pair. In the simplest case, this comparison is a simple division of the intensities.

Now, in an iteration step d), a correction image is reconstructed from the n correction raw images by combining image processing. While iteration steps a) to b) were the simulation of n raw images, iteration step d) is the reconstruction of an image of the sample, but not on the basis of actual raw images or the simulated raw images but on the basis of the correction raw images, which express the deviation between the simulated raw images and the provided raw images. Consequently, the reconstructed correction image also reproduces the deviation between the actual image of the sample and the estimated image of the sample.

In this reconstruction, i.e., in the implementation of iteration step d), a filtering step is carried out as iteration partial step d1), said filtering step partly or completely suppressing at least one signal component which corresponds to an order of diffraction of the illumination pattern in the frequency domain. The filtering is preferably implemented as Gaussian notch filtering. From the signaling point of view, it therefore suppresses the one of the carrier frequencies and thereby promotes the generation of the correction image in the iteration method.

The filtering is carried out in a plurality of iterations. On account of the filtering step, the number of possible iterations through the iteration loop is significantly increased in relation to the prior art, and so a very much better resolution is ultimately achieved; in particular, it is possible to carry out significantly more than the three or no more than five iterations specified in the prior art. Preferably, the filtering is carried out in a proportion of the iterations. This proportion can be set by a fixed alternation (e.g., filtering in every n-th iteration) but can also be set according to statistical criteria (e.g., randomized with a certain probability for the filtering step). Preferably, the proportion is greater than or equal to 1:5, particularly preferably greater than or equal to 1:3 or 1:2. Moreover, the filtered order of diffraction can change from iteration to iteration in which the filtering step is carried out in order to save computational complexity. Even with such reduced filtering, the number of possible iterations and hence the resolution can be increased in relation to the prior art. Optimally, filtering is carried out in each run through the iteration loop.

At the end of each iteration loop, the correction image obtained is used to correct the estimated image of the sample, the corrected version of which then is the next starting point in iteration step a), i.e., used as estimated image of the sample in the next run through the iteration loop.

Preferably, the suppressed or attenuated signal component corresponds to the zero order of diffraction since this filtering in the iteration loop suppresses the out-of-focus background as the latter is connected to the zero order of diffraction. As a result, a reconstruction of the provided raw images into the image of the sample which has a high resolution in the depth, in particular, is obtained, i.e., a reconstruction with a particularly good depth of field. This applies in particular if the illumination pattern is a depth-structured Talbot pattern. There is a significantly sharper depth resolution by the suppression of the out-of-focus background. The restrictions of publications [22]-[24], which are only able to treat the two-dimensional case, to circumvent problems with the out-of-focus background are thereby lifted.

Preferably, the +1st and −1st order of diffraction is also filtered, particularly preferably all orders of diffraction are filtered. Further, the degree of suppression and/or the filter bandwidth are preferably chosen on an individual basis for the orders of diffraction. The suppression of higher orders of diffraction brings about additional artifact suppression. This additionally improves the reconstruction.

The filtering avoids carrier frequencies inadvertently being assigned to the image of the sample during the deconvolution. Otherwise, such a misassignment would be possible since the carrier frequencies would inadvertently be shifted to higher frequency bands corresponding to the sample information during the deconvolution on account of their comparatively low-frequency nature and would therefore contribute to the image of the sample.

A particularly advantageous configuration of the iteration method follows the Richardson-Lucy deconvolution principle. However, the method is not restricted thereto and a maximum likelihood estimation is equally possible.

Filtering is particularly preferably carried out in the frequency domain, e.g., as Fourier filtering, i.e., provides a preceding Fourier transform and a subsequent inverse Fourier transform in the case of an iteration in the spatial domain. In the case of an embodiment of iteration loop in the Fourier domain, such separate back and forth transformations are dispensable. Then, it is in particular also provided for as an option that, in iteration step b), the simulation of each raw image is implemented by a convolution of the estimated image with the point spread function and one of the illumination pattern functions. The reconstruction of the correction image then is a deconvolution of the n correction raw images using the point spread function and the n illumination pattern functions. Here, the signal is available in the form of the orders of diffraction, simplifying filtering. Then, the estimated image and the correction image can also be present in Fourier transformed form in the iteration method as this saves calculation time. After the iteration method has been completed, there is an inverse transformation of the estimated image into the spatial domain.

The method improves the generation of an image from raw images obtained from imaging or the simulation of a sample with different relative positions of an illumination pattern. Naturally, the use in SIM microscopy is particularly preferred, i.e., directly in combination with obtaining appropriate images with a microscope. However, this is by no means mandatory because, in particular, raw images generated much longer ago can subsequently be reconstructed to form an image of the sample using the image evaluation method since the latter is significantly better than the prior art. Since such raw images are often stored independently in SIM microscopy, the image evaluation method can also be applied to already comparatively old raw images.

When used in the SIM microscopy method, use is made of a microscope whose imaging properties are characterized by a point spread function. This is the point spread function provided in step c) of the image evaluation method. Equally, the n raw images of the sample are each provided by illuminating the sample with one of the individually positioned SIM illumination patterns and imaging the sample by means of the microscope, i.e., under the action of the point spread function.

Since the image evaluation, as explained, can by all means be carried out at a later stage and completely independently of the microscopy method itself, the invention also comprises a computer program comprising commands which, when the program is executed by a computer, cause the latter to read the specified raw images of the sample, the illumination pattern functions and the point spread function and to carry out step d), i.e., the iteration method including the filtering step (iteration partial step d1). Equally, the invention is realized by a computer-readable data medium, on which this computer program is stored, or by a data medium signal, which transfers this computer program. Likewise, the invention is realized by a data processing apparatus comprising a processor which is configured such that it reads the raw images of the sample, the illumination pattern functions and the point spread function and carries out step D) of the aforementioned method.

It goes without saying that the features mentioned above and those yet to be explained below can be used not only in the combinations specified but also in other combinations or on their own, without departing from the scope of the present invention.

The invention will be explained in even more detail below on the basis of exemplary embodiments, with reference being made to the appended drawings, which likewise disclose features essential to the invention. These exemplary embodiments are only illustrative and should not be construed as restrictive. For example, a description of an exemplary embodiment with a multiplicity of elements or components should not be construed as meaning that all of these elements or components are necessary for implementation. Rather, other exemplary embodiments can also contain alternative elements and components, fewer elements or components, or additional elements or components. Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained a number of times.

DETAILED DESCRIPTION OF THE EMBODIMENTS

Figure 1:
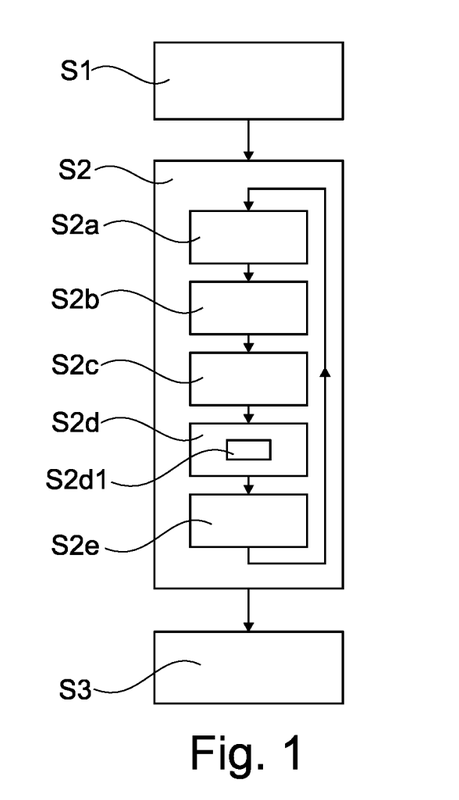
FIG. 1 is an illustration in a block diagram of an embodiment of a method for image evaluation.

FIG. 1 shows, as a block diagram, an image evaluation method for raw images, as arise in SIM microscopy for example. The method substantially comprises three steps S1-S3, of which step S2 is an iteration method carried out in the method. Various data or specifications which should form the basis of the image evaluation are provided in step S1. Firstly, these are n raw images, as typically occur in SIM microscopy. Each of the raw images is an image representation of one and the same sample, which is illuminated by an illumination pattern.

The raw images differ to the effect of how the illumination pattern is individually positioned. The individual positioning is specified in each case by an illumination pattern function, which defines or reproduces the individual relative position and/or alignment of the illumination pattern. The n illumination pattern functions either can already be provided directly, or they are ascertained from the raw images in a known manner on the basis of a preceding method. The illumination pattern has illumination pattern frequencies, which arise from the generation of the illumination pattern by interference, for example. If reference is made to this type of generation, the illumination pattern frequencies can also be understood to be orders of diffraction. This interpretation is usual, even if the generation was implemented differently. The frequencies of the orders of diffraction correspond to spatial illumination pattern frequencies, albeit under the consideration that the orders of diffraction are complex conjugate variables in the frequency domain. Thus, above the fundamental frequency, which is a common mode component, there always are pairs of two orders of diffraction of equal absolute value in the frequency domain for each of the illumination pattern frequencies defined in the spatial domain. This is vividly illustrated in FIG. 2 of publication [2].

Secondly, a PSF is provided, which is characteristic for the imaging into the n raw images.

Now, an iteration method comprising steps S2a, S2b, S2c, S2d and S2e is carried out in step S2 using the requisites (n raw images, n illumination pattern functions, PSF) provided in step S1. In the present exemplary embodiment, the iteration method is image processing which carries out a Richardson-Lucy iteration. To this end, first an estimated image of the sample is provided or generated in an iteration step S2a. This estimated image of the sample is continuously improved during the iteration method and represents the image of the sample at the end. A uniform grayscale image can be provided in S2a for a first iteration through the iteration loop S2a-S2e. In this case, for the sake of simplicity, the consideration below is restricted to the one-dimensional case, i.e., the generation of the raw images as pure phase images. i.e., in a fixed rotational position of the strip pattern. Then, the resolution is increased transversely to the strip direction. As a person skilled in the art is aware, an isotropic increase can be achieved by using, e.g., three rotational positions per displacement position. Although the image reconstruction or image evaluation of the raw images is then computationally more complex, it completely follows the principles explained here for the one-dimensional case.

Subsequently, a simulation generating n simulated raw images is carried out in an iteration step S2b using the PSF and the n illumination pattern functions. In the 1-D case considered here for the sake of simplicity, the number of raw images corresponds to the number of illumination pattern functions, i.e., the number of individual displacement positions which the illumination pattern had in the provided n raw images since each illumination pattern function describes exactly one of the utilized displacement positions—within the meaning of phases of the relative position of the illumination pattern.

In a step S2c, there is a one-to-one assignment of the simulated raw images to the provided raw images, with the assignment being implemented on the basis of the phase angles of the illumination pattern. Thus, each of the n simulated raw images is assigned to exactly that one of the n raw images provided which is based on the same illumination pattern function, i.e., displacement position or phase angle in the 1-D case. In this way, n pairs of simulated and provided raw images arise, wherein each pair was generated on the basis of the same phase angle of the illumination pattern function—the provided raw image in the actual imaging, the simulated raw image in the simulated imaging. After this assignment, a comparison is carried out within the pairs, i.e., in each case between assigned simulated raw image and provided raw image, in step S2c. By way of example, this comparison can be the formation of a ratio such that the intensity ratio is formed for each pixel of the provided raw image and of the associated simulated raw image (naturally, the simulation of the raw images is implemented on the basis of a compatible pixel basis to the pixels of the provided raw images; ideally, the pixel bases are identical). In this way, correction raw images are obtained at the end of the step S2c—there is a correction raw image for each phase angle of the illumination pattern function. Each correction raw image specifies the deviation between the simulated raw image and provided raw image for one of the phase angles.

The image of the sample is reconstructed from the correction raw images in a step S2d. Here, filtering which attenuates or suppresses signal components corresponding to an order of diffraction of the illumination pattern is carried out in a partial step S2d1. By way of example, this can be the zero order of diffraction. Preferably. Gaussian notch filtering is carried out in embodiments. The zero order of diffraction represents an out-of-focus background signal and would adversely affect the depth of field of the reconstructed image. However, it is also possible to suppress further orders of diffraction/carrier frequencies which would lead to artifacts (see above).

The result of the reconstruction of step S2d is a correction image which reproduces the deviation between the estimated image of step S2a. Therefore, the estimated image is updated using the correction image and then this updated estimated image is used in the next iteration in step S2a.

The iteration method of step S2 is terminated according to various criteria. Possible criteria include reaching a maximum number of iterations or dropping below a correction threshold in the correction image in step S2e, i.e., if the update to be undertaken for the next iteration drops below a minimum threshold. The latter is an indication for the iteration method having converged sufficiently.

As a result, the last-obtained estimated image, which is then no longer used for the iteration since the iteration method was terminated, is output as a result in step S3. It represents an image of the sample with greatly improved properties, in particular a greatly improved depth of field and an improved suppression of artifacts.

Figure 2:
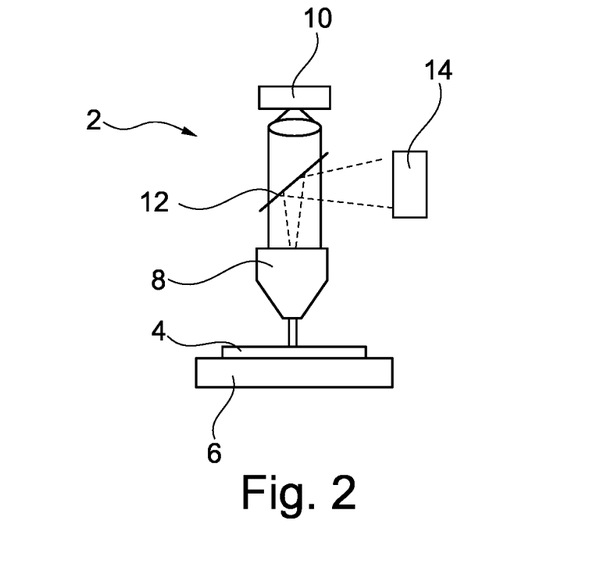
FIG. 2 illustrates a microscope that can be used for generating raw images which are evaluated in the method as per FIG. 1.

FIG. 2 schematically shows a microscope 2, as can be used to provide the raw images. The microscope 2 images a sample 4 which is located on a sample carrier 6. The imaging is implemented by means of an objective 8, which images the sample onto a detector 10 by means of a tube lens not denoted in any more detail. By way of a beam splitter 12, an illumination device 14 illuminates the sample 4 through the objective 8 in such a way that structured illumination which is adjustable in terms of relative position and/or alignment is implemented, as known to a person skilled in the art for SIM technology.

Figure 3:
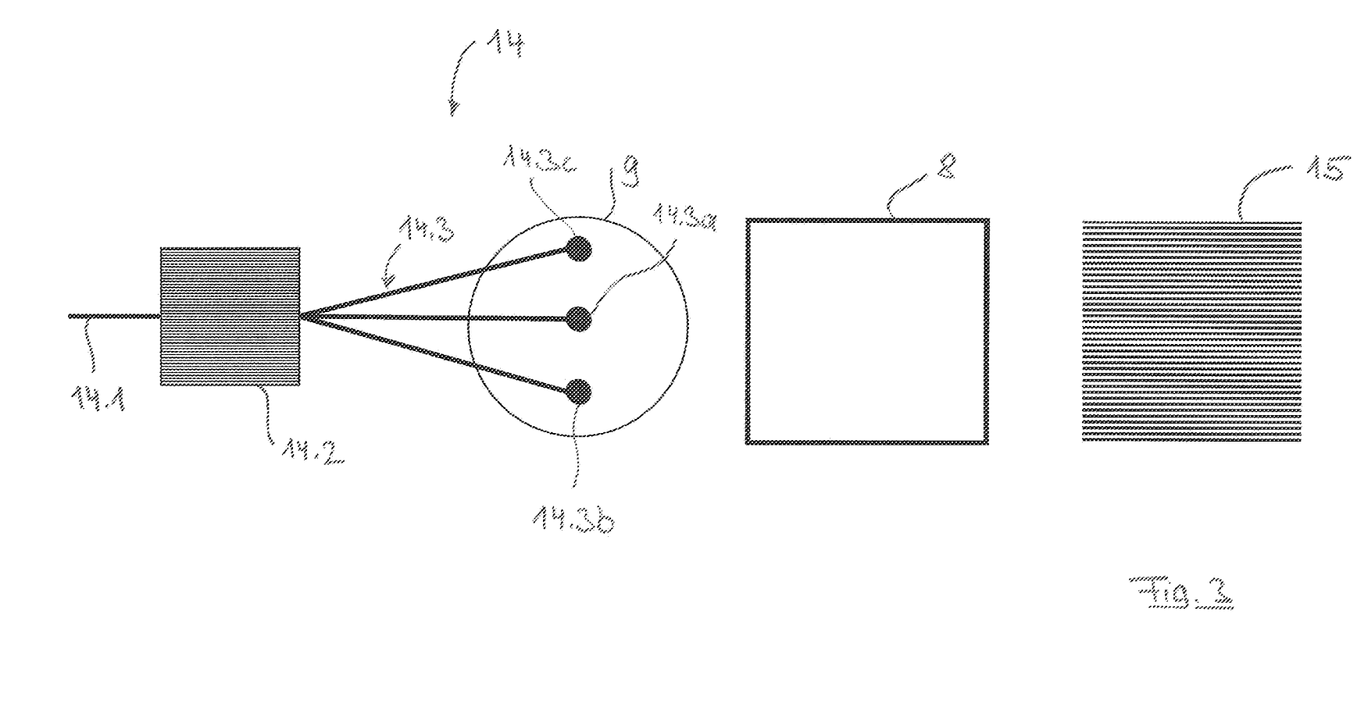
FIG. 3 is a schematic illustration of an illumination device of the microscope of FIG. 2.

An example of the realization of the illumination is shown in FIG. 3. The illumination device 14 provides an origin beam 14.1, for example from a laser (not illustrated in any more detail). With the aid of a grating 14.2, this origin beam 14.1 is decomposed into three partial beams 14.3, which are optically shaped by suitable lenses or other optical elements (not illustrated in any more detail) so that three adjacent light points, with a central point 14.3a for the central partial beam, and two adjacent points 14.3b and 14.3c for the lateral partial beams arise in an entry pupil 9 (which is also referred to as back focal plane) of the objective 3. The three points in the objective pupil 9 lead to a strip-shaped SIM illumination pattern 15 arising in the sample as a result of interference. This illumination pattern 15 is only shown in a plan view in FIG. 3, i.e., rotated through 90°; the same applies to the objective pupil 9 and the points 14.3a-14.3c. In fact, the illumination pattern 15 generated is a Talbot pattern which is embodied as a strip pattern not only in the xy-plane, in which it is shown in FIG. 3, but also perpendicular thereto, i.e., along the depth extent of the sample 4.

The points can also be generated differently, for example by optical fibers that end in the pupil or suitably arranged tilt mirror matrices. Nor is the number restricted to three (see below).

This generation of the illumination pattern 15 shown in FIG. 3 is exemplary, but it has formed for historical reasons as the usual way of considering things, in which the various discrete frequencies present in the illumination pattern 15 are referred to as orders of diffraction. As already explained, these are carrier frequencies from a signaling point of view. Above the fundamental frequency/zero order of diffraction, the orders of diffraction correspond to spatial illumination pattern frequencies, albeit as complex conjugate variables, and so there always are pairs of two orders of diffraction of equal absolute value present above the fundamental frequency. By way of example, the strip-shaped SIM diffraction pattern has three spatial frequencies, a fundamental frequency and a first and a second higher spatial frequency. The fundamental frequency corresponds to a zero order of diffraction. There are additionally four further orders of diffraction, two first and two second. The absolute value of the two first orders of diffraction in each case corresponds to the first higher spatial frequency; the absolute value of the two second orders of diffraction in each case corresponds to the second higher spatial frequency. An analogous statement applies in the case of a two-dimensionally distributed point pattern as SIM illumination pattern (see below), with a greater number of orders of diffraction, e.g., 13, naturally being present here.

One option for generating the raw images consists of illuminating the sample with the illumination pattern 15 and recording the light reflected by the sample or the fluorescence-emitted light in the case of fluorescence excitation. As will still be explained below on the basis of mathematical formalism in relation to FIG. 5, the image of the sample is a convolution of the illumination pattern function, the actual location information in the sample and the point spread function of the microscopic imaging.

Figure 4:
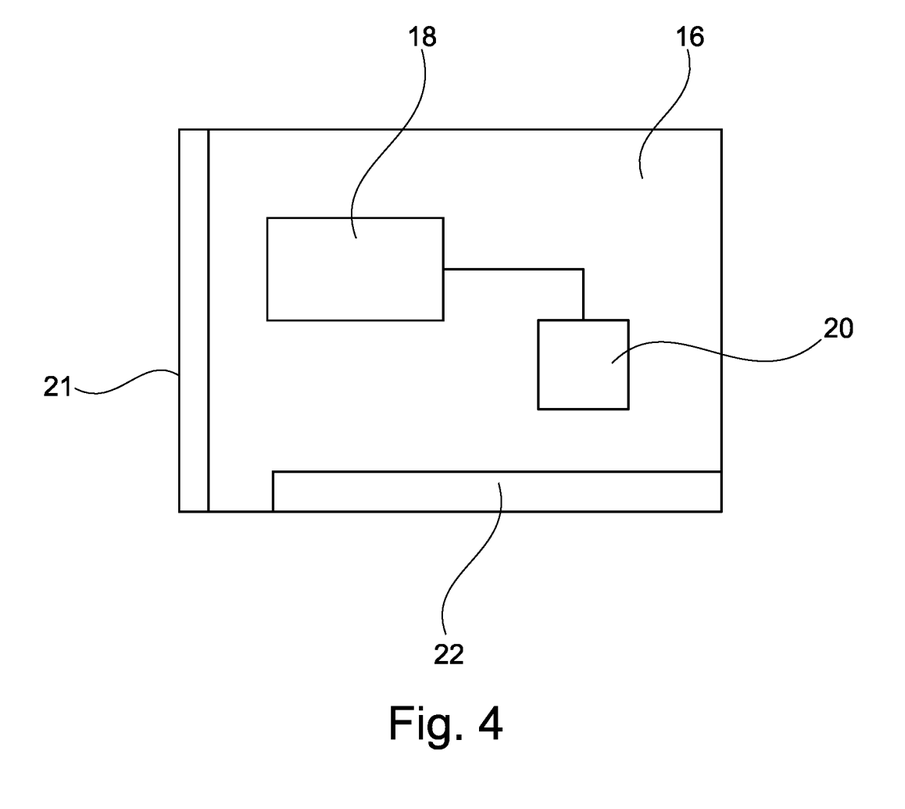
FIG. 4 is a schematic illustration of an image evaluation apparatus.

FIG. 4 schematically shows an apparatus, more particularly a computer 16, which is suitable for the image evaluation. The computer 16 comprises a processor 18 and RAM 20, in which a computer program is stored which issues commands to the processor 18 such that the latter ultimately carries out the method of steps S1-S3 as per FIG. 1. Here, the requisites, i.e., the PSF, the n raw images and the n illumination pattern functions are made available via an input interface 22 and the computer 16 outputs the reconstructed image of the sample via an interface 22. Optionally, the computer 16 calculates the n illumination functions in advance.

Figure 5:
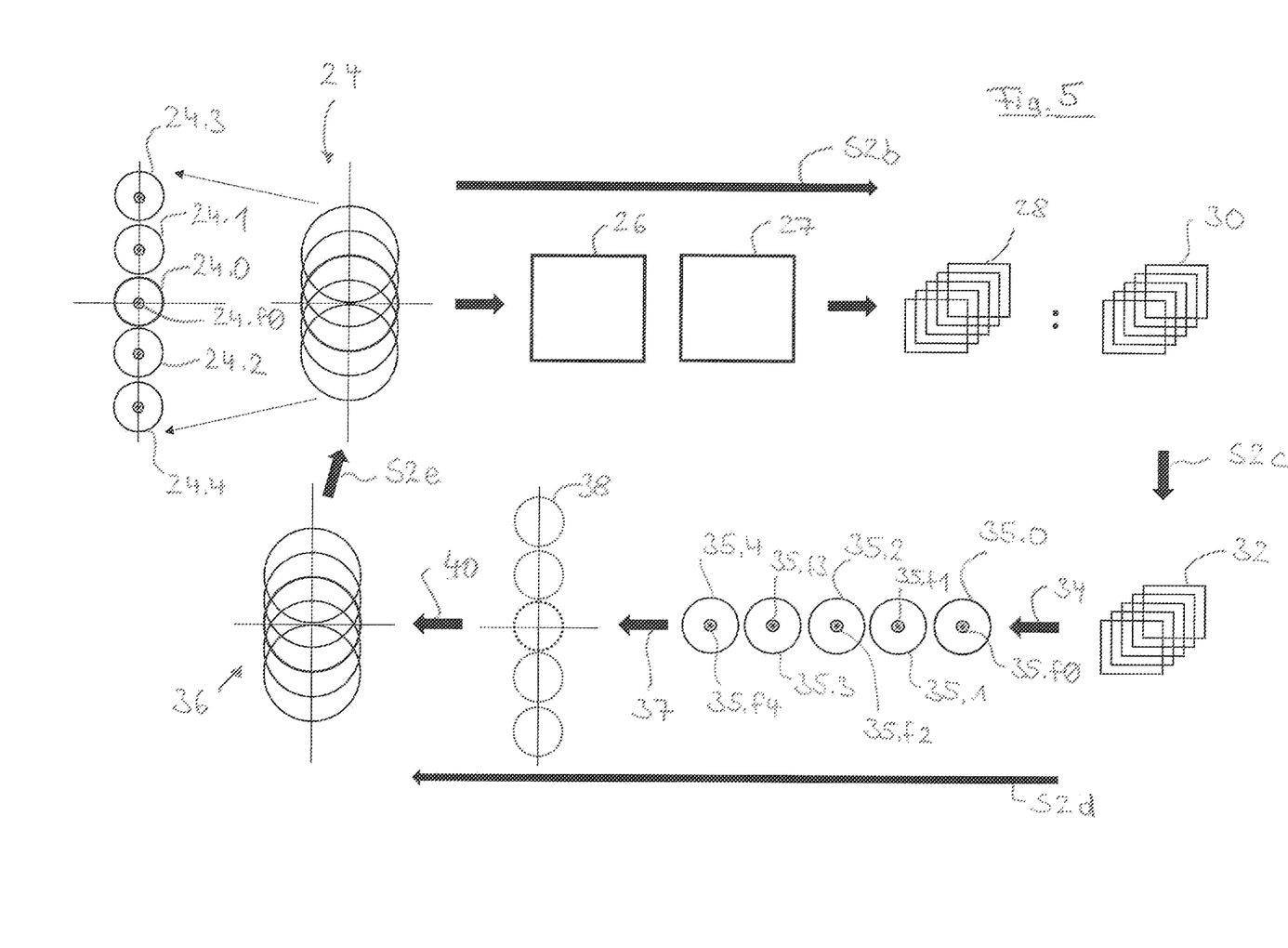
FIG. 5 is a schematic illustration for elucidating an iteration method which is used in the image evaluation method as per FIG. 1.

FIG. 5 schematically shows the procedure in the iteration method S2.

The estimated image is denoted by 24. In step S2b, this is the start point of a simulation which generates the n simulated raw images 28 using the n illumination pattern functions 26 and the PSF 27. These are then compared to the n provided raw images 30 such that the n correction raw images 32 are available at the end of the step S2c. In the illustration of FIG. 5, n=5 in exemplary fashion. The correction raw images 32 are then subjected to a deconvolution in step S2d, included in which are, once again, the PSF and the n illumination pattern functions. The aforementioned filtering 37 takes place additionally.

The individual iteration steps are plotted in the figure. The iteration method S2 is represented in the frequency domain in FIG. 5, in particular with regards to the symbolism of the estimated image 24, of the correction image 36 and of the individual stages of deconvolution in the iteration step S2d. The estimated image 24 of the sample is shown in the frequency domain in FIG. 5 as a stack of circles strung together along the imaginary axis, the center of each circle corresponding to one of the carrier frequencies or orders of diffraction. The left illustration expands these circles stacked on one another by virtue of both their centers being pulled apart on the imaginary axis (the vertical axis) and the circle diameter being reduced for visualization purposes. Five frequency ranges 24.0 to 24.4 arise, which each carry image information of the sample. The frequency range 24.0 is the one able to be transmitted by the objective. In the illustration of FIG. 5, all centers of the circles are located in the image 24, i.e., the carrier frequencies of the frequency ranges of the sample information lie within this frequency range 24.0 which can be transmitted by the optical unit. However, this is no longer evident in the pulled apart illustration to the left of image 24 since the circle diameter, as already mentioned, has been reduced.

The carrier frequencies, of which the lowest carrier frequency, i.e., the zero order of diffraction, of the regular SIM illumination pattern is denoted by 24.f0, are all located within the range transmittable by the imaging optical unit of the microscope. The image information, in the form of the above-described moiré pattern, is superposed on the carrier frequencies and needs to be suitably separated in the SIM image analysis and synthesized to form the image of the sample, as explained in the introductory part.

To this end, a simulation of the imaging of the sample with the various illumination states is initially generated in iteration step S2b, and the simulated raw images 28 obtained thus are compared to the measured raw images 30 and the comparison result in the form of correction raw images 32 is then converted back into a correction image 36 in a deconvolution. This deconvolution is implemented in at least two stages. Initially, the frequency ranges are extracted individually with the respective carrier frequencies from the correction raw image 32 (extraction 34). Then, n=5 spectra 35.0, 35.1, 35.2, 35.3 and 35.4 are obtained, each of which are centered around one of the carrier frequencies $35.f0$, $35.f1$, $35.f2$, $35.f3$ and $35.f4$. These carrier frequencies are the carrier frequencies that were already described for the simulated image 24; $35.f0$ is the same carrier frequency as $24.f0$.

The spectra obtained in such individual fashion then need to be shifted to the appropriate site in the frequency domain such that their center is located at the locations of the carrier frequencies. Shifted spectra 38 are obtained. Filtering is carried out within the scope of this displacement, as yet to be explained below, said filtering suppressing the carrier frequencies $35.f0$-$35.f4$, which is why the shifted spectra 38 are plotted without the corresponding central points that symbolize the carrier frequencies. Subsequently, the spectra are then combined in an addition 40 to form the correction image 36.

In embodiments, the filtering is notch filtering and occurs during a plurality of iterations, preferably in each iteration, of the iteration loop of step S2 such that it repeatedly contributes to the image improvement. In this way, it is possible to run through the iteration loop of step S2 very frequently and hence achieve a high quality of the reconstruction, said iteration loop being terminated, for example, if no significant correction requirements of correction image 36 are indicated in step S2e.

Below, the mathematical background for the image evaluation method on the basis of the Richardson-Lucy deconvolution process is explained in exemplary fashion for the strip-shaped SIM illumination pattern 15, with reference being made to FIG. 5. In this case, fluorescence microscopy is considered, and so the illumination corresponds to an excitation.

The illumination pattern 15 consists of a sequence of strips which can be generated by three partial beams 14.3a-14.3c in the illumination pupil 8 (see above) such that the illumination pattern 15 is described by the following equation:

$$I(x,y,z,\varphi)=a_0^2/2+a^2+a^2\cos(2*\hat{k}_x x+2*\hat{k}_y y+2\varphi)+2*aa_0 \cos(\hat{k}_x x+\hat{k}_y y+\varphi)*\cos((\hat{k}-\hat{k}_z)z-\varphi_0) \quad (1)$$

Here, $a_0$ is the intensity of the central partial beam 14.3a and a is the intensity of the partial beams 14.3b, 14.3c adjacent on both sides. $\hat{k}_x$, $\hat{k}_y$, $\hat{k}_z$ are the x, y and z components of the wave vector of the lateral partial beams 14.3b, 14.3c, $\hat{k}$ is the z-component of the wave vector of the central partial beam 14.3a, $(\hat{k}-\hat{k}_z)$ describes the depth-dependence of the illumination pattern 15, which is formed by a cosine that is centered about a central plane, as a rule the focal plane of the illumination. Such a depth structure is also referred to as a Talbot pattern. $\varphi_0$ is the phase angle of this cosine curve (Talbot pattern) in relation to the z-coordinate. As easily shown by a Fourier transform, the illumination pattern is characterized by signal components with discrete spatial frequencies, which correspond to orders of diffraction.

$\varphi$ denotes the phase angle of the illumination pattern 15 in the xy-plane; i.e., it is the parameter denoting the individual displacement position of the SIM illumination pattern. They differ from one another only in terms of the value for $\varphi$. By way of example, in the case of five individual SIM illumination patterns there are five different values for $\varphi$. Below, this is expressed by an index m. Equation (1) supplies the illumination pattern functions 26, one for each phase angle $\varphi_m$. In the case of the strip grid, the phase angles are preferably equally distributed over 180° within certain limits. A rotation of the SIM illumination pattern remains unconsidered here: i.e., the explanations are restricted to the 1-D case of the resolution increase transversely to the longitudinal direction of the strip grid.

The sample image, i.e., the emitted intensity $I_{em}$ in the case of fluorescence microscopy, corresponds to the multiplication of the illumination pattern intensity $I(x, y, z, \varphi)$ by the (initially unknown) sample intensity $S(x, y, z)$ and the PSF of the microscopic imaging. $H(x, y, z)$. Thus, the following is obtained:

$$I_{em}(x,y,z,z_0,\varphi)=\int dx'dy'dz'I(x',y',z',\varphi)S(x',y',z_0-z')H(x-x', y-y',z+z') \quad (2)$$

In Equation (2), z denotes the depth coordinate; $z_0$ is an additional depth distance. The position of the focal plane of the illumination, i.e., the central plane of the Talbot pattern, is at z=0; $z_0$ denotes the distance of a plane from the focal plane for the case of z=0.

As shown in Equation (2), the high spatial frequencies of the sample are modulated onto the comparatively low illumination pattern frequencies, which therefore serve as carrier frequencies. As a result, the SIM illumination and the imaging for each raw image cause a moiré image, the pattern of which contains the sample information in frequency regions which, considered on their own, are located beyond the diffraction limit of the optical unit.

The target of the image evaluation described now is that of extracting the frequencies of the sample information from the moiré image and put these together to form the image of the sample. This requires a plurality of raw images with different phase angles, i.e., different values $\varphi_m$ for $\varphi$, of the illumination pattern so that the frequencies of the sample information are able to be separated and are able to be shifted into the higher frequency bands associated therewith, which frequency bands attain the increase in resolution.

If z=0, the following is obtained as intensity from a plane of the sample which is spaced apart from the focal plane of the illumination by $z_0$:

$$I_{em}(x,y,z_0,\varphi)=\int dx'dy'dz'I(x',y',z',\varphi)S(x',y',z_0-z')H(x-x', y-y',z') \quad (3)$$

In the Richardson-Lucy iteration method used here in exemplary fashion, this equation is used to calculate n simulated raw images 28 from the estimated image 24, which is used as the estimate for the actual sample intensity $S(x, y, z)$. The generation of the simulated raw images 28 represents a simulation of imaging the sample (in the form of the estimated image 24), which is why the illumination pattern functions 26 and the PSF 27 are included (cf. FIG. 5).

The calculation is preferably carried out in the frequency domain, which is advantageous in view of the subsequent deconvolution. A Fourier transform in x, y and z yields (a superscript index "f" denotes reference to the frequency domain below):

$$I_{em}^f(k_x,k_y,k_z,\varphi)=\int dk'_x dk'_y dk'_z I^f(k'_x,k'_y,k'_z,\varphi)S^f(k_x-k'_x,k_y-k'_y,k'_z)H^f(k'_x,k'_y,k_z-k'_z) \quad (4)$$

If Equation (1) is inserted into Equation (4), this yields:

$$I_{em}^f(k_x, k_y, k_z, \varphi) = A_0 H^f(k_x, k_y, k_z)S^f(k_x, k_y, k_z) + A_2 H^f(k_x, k_y, k_z) \quad (5)$$

-continued $$\{S^f(k_x + 2\hat{k}_x, k_y + 2\hat{k}_y, k_z)e^{-i2\varphi} + S^f(k_x - 2\hat{k}_x, k_y - 2\hat{k}_y, k_z)e^{i2\varphi}\} +$$
$$A_1\{H^f(k_x, k_y, k_z + [\hat{k}_z - \hat{k}])e^{i\varphi_0} + H^f(k_x, k_y, k_z - [\hat{k}_z - \hat{k}])e^{-i\varphi_0}\}$$
$$S^f(k_x + \hat{k}_x, k_y + \hat{k}_y, k_z)e^{-i\varphi} +$$
$$A_1\{H^f(k_x, k_y, k_z + [\hat{k}_z - \hat{k}])e^{i\varphi_0} + H^f(k_x, k_y, k_z - [\hat{k}_z - \hat{k}])e^{-i\varphi_0}\}$$
$$S^f(k_x - \hat{k}_x, k_y - \hat{k}_y, k_z)e^{i\varphi}$$

Here, $A_j$ with j=0, 1, 2 denote the intensities of the orders of diffraction of the illumination pattern, which emerge from the pre-factors in Equation (1). Thus, the following applies: $A_0=a_0^2/2+a^2$; $A_1=a^2$ and $A_2=a_0 a$. Further, $k=(k_x, k_y, k_z)$ is the wave vector which refers to the orders of diffraction, i.e., the carrier frequencies.

On account of the n different displacement positions of the illumination pattern 15, Equation (5) is also obtained n-times—once for each of the phases $\varphi=\varphi_m$, m=1, . . . , n. Each equation supplies a simulated raw image 28, and so, e.g., n=5 simulated raw images 28 arise (iteration step S2b).

Then, the iterative method carries out a comparison between the simulated raw images 28, denoted as $I_{em}$ (x, y, $z_0$, $\varphi$), and the provided raw images 30, written as $I_{em}^M$ (x, y, $z_0$, $\varphi$) below, in each iteration (iteration step S2c). The difference is evaluated in each iteration and subsequently has an effect as an update of the estimated image 24 of the sample. Since the image representation, i.e., the provided raw images 30, is subject to a Poisson statistic, the difference between the simulated raw images 28 and the provided raw images 30 is preferably expressed as a ratio; other comparison measures are possible:

$$R(x, y, z_0, \varphi) = \frac{I_{em}^M(x, y, z_0, \varphi)}{I_{em}(x, y, z_0, \varphi)} \quad (6)$$

The difference R represents correction raw images 32, once again with the phases $\varphi=\varphi_m$, m=1, . . . , n as individualizing parameter.

In a deconvolution process, the correction raw images 32 are converted into a correction image 36 of the sample, which is then used in iteration step S2e to carry out the update of the estimated image 24.

For deconvolution purposes, the correction raw images 32 are Fourier transformed:

$$R^f(k,\varphi) = R^f(k_x, k_y, k_z, \varphi) = FT\{R(x, y, z_0, \varphi)\} \quad (7)$$

The n individual spectra $S_R^f$ are extracted from the correction raw images 32. In FIG. 5, they are symbolized at 35.0 to 35.4 and are the result of an extraction 34 for which the OTF needs to be used (more precisely, the complex conjugate OTF* must be used since this is a deconvolution). The spectra must be shifted to certain sites in the frequency domain for each order of diffraction, i.e., carrier frequency, specifically to the locations (k+j$\hat{k}_q$), where j={0, −2, 2, −1, 1}. Here, $\hat{k}_g$=[$\hat{k}_x$, $\hat{k}_y$, 0] denotes the wave vector for the orders of diffraction, i.e., the carrier frequencies, and hence the sites in the frequency domain which are assigned to the carrier frequencies and to which the spectra should be shifted. In FIG. 5, the frequencies in the non-shifted state are denoted by 35.f0 to 35.f4.

The spectra are shifted in accordance with the wave vectors. Before this, they are filtered (filtering and displacement 37 in FIG. 5), as yet to be explained below. The index j once again individualizes the shifts. The number of displacements defines the number of phases required for the displacement positions of the illumination pattern 15, as known from the prior art (cf., inter alia, [2], FIG. 2). Thus, there are exactly n different values for j and form.

Moreover, there is filtering by virtue of each spectrum being multiplied by a function $g_n(k)=g_n(k_x, k_y, 0)$. In this case, the exemplary embodiment is a notch filter with Gaussian form, which satisfies the following equation (other filter functions are equally possible):

$$g_n(k) = g_n(k_x, k_y, 0) = 1 - b_n \exp\left\{-\frac{(k_x - j\hat{k}_x)^2}{2\sigma_n^2} - \frac{(k_y - j\hat{k}_y)^2}{2\sigma_n^2}\right\} \quad (8)$$

The factor $b_n$ is used to set the degree of suppression (between 0 and 1). The variable $\sigma_n$ sets the width of the filter. The values should be chosen to fit to the applicable conditions and can be established by simple trials. In this case, different values can be used for the orders of diffraction. Preferably, $b_n$ is greatest for the zero order of diffraction. The values for j={0, −1, 1, −2, 2} denote the orders of diffraction suppressed or attenuated by the filter; j=0 filters the zero order of diffraction (fundamental frequency; see above), j=−1, +1 filters the first orders of diffraction (first higher spatial frequency; see above) and j=+2, −2 filters the second orders of diffraction (second higher spatial frequency; see above). It is not necessary for all orders of diffraction to be filtered. It is expedient to filter the zero order of diffraction in any case.

These processes (extraction 34, filtering and displacement 37) can be combined mathematically in the following system of equations, on the basis of which the correction raw images 32 are deconvolved to form the correction image 36 (iteration step S2d):

$$\begin{bmatrix} S_R^f(k) \\ S_R^f(k+2\hat{k}_g) \\ S_R^f(k-2\hat{k}_g) \\ S_R^f(k+\hat{k}_g) \\ S_R^f(k-\hat{k}_g) \end{bmatrix} = \begin{bmatrix} g_0(k)OTF_0^*(k) & 0 & 0 & 0 & 0 \\ 0 & g_{-2}(k)OTF_{-2}^*(k) & 0 & 0 & 0 \\ 0 & 0 & g_2(k)OTF_2^*(k) & 0 & 0 \\ 0 & 0 & 0 & g_{-1}(k)OTF_{-1}^*(k) & 0 \\ 0 & 0 & 0 & 0 & g_1(k)OTF_1^*(k) \end{bmatrix} \times \quad (9)$$

$$\left\{\begin{bmatrix} A_0 & A_0 & A_0 & A_0 & A_0 \\ A_2 e^{i2\varphi_1} & A_2 e^{i2\varphi_2} & A_2 e^{i2\varphi_3} & A_2 e^{i2\varphi_4} & A_2 e^{i2\varphi_5} \\ A_2 e^{-i2\varphi_1} & A_2 e^{-i2\varphi_2} & A_2 e^{-i2\varphi_3} & A_2 e^{-i2\varphi_4} & A_2 e^{-i2\varphi_5} \\ A_1 e^{i\varphi_1} & A_1 e^{i\varphi_2} & A_1 e^{i\varphi_3} & A_1 e^{i\varphi_4} & A_1 e^{i\varphi_5} \\ A_1 e^{-i\varphi_1} & A_1 e^{-i\varphi_2} & A_1 e^{-i\varphi_3} & A_1 e^{-i\varphi_4} & A_1 e^{-i\varphi_5} \end{bmatrix} \begin{bmatrix} R^f(k,\varphi_1) \\ R^f(k,\varphi_2) \\ R^f(k,\varphi_3) \\ R^f(k,\varphi_4) \\ R^f(k,\varphi_5) \end{bmatrix}\right\}$$

It is evident that all orders of diffraction are filtered in this example.

Since this is a deconvolution, the complex conjugate OTFs, which are denoted by a *, appear in Equation (7). Equation (9) multiplies each correction raw image 32 by the complex conjugate OTF*$_n$ of the optical transfer function OTF$_n$ that fits to the respective shift:

$$OTF_j(k_x, k_y, k_z) = H^f(k_x, k_y, k_z), j=0,-2,2$$

$$OTF_j(k_x, k_y, k_z) = H^f(k_x, k_y, k_z + [\hat{k}_z - \hat{k}])e^{+i\varphi_0} + H^f(k_x, k_y, k_z + [\hat{k}_z - \hat{k}])e^{-i\varphi_0}, j=-1,1 \quad (10)$$

Then n spectra $S_R^f(k+j^{\hat{k}_g})$ (with j=0, −2, 2, −1, 1) obtained are added (summation 40 in FIG. 5) and inverse Fourier transformed in order to obtain the correction image 36, $S^R(x, y, z)$. According to the Richardson-Lucy deconvolution algorithm, the next estimated image 24 of the sample is obtained by multiplying the last estimated image with the correction image 36 (update in iteration step S2e):

$$S_{t+1}(x,y,z) = S_t(x,y,z) \times S^R(x,y,z) \quad (11)$$

Here, the index t+1 denotes the updated estimated image and the index t denotes the last estimated image. Naturally, the update (iteration step S2e) is the inverse operation to the comparison (iteration step S2c). Should it not have been a division but, for example, a difference that was used in S2c, then the update has to be adapted accordingly, for example to a summation.

The update rule from the correction image 36 to the new estimated image 24 substantially follows the following relationship:

$$S_{t+1}(x, y, z_0) = S_t(x, y, z_0) \times \sum_{m=1}^{n} \frac{I_{em}^M(x, y, z_0, \varphi_m)}{I_{em}(x, y, z_0, \varphi_m)} \otimes H^f(x, y, z_0) \, I(x, y, z_0, \varphi_m) \quad (12)$$

In the equation above, the fraction represents the generation of the n correction raw images 32 (n=5 in this example), i.e., the iteration step S2c. As is conventional, $\otimes$ denotes the convolution operator. For simplification purposes, the filtering is not contained here; it would be part of the deconvolution.

The update need not be carried out in the spatial domain. To shorten the calculation method, the entire iteration can be undertaken in the frequency domain. To this end, it is only necessary to initially carry out a Fourier transform of the very first estimated image and an inverse transform of the estimated image following the last update at the end. FIG. 5 shows this computationally sparing variant, i.e., only relates to the frequency domain.

The notch filter $g_0(k)$ suppresses the carrier frequency/zero order of diffraction 35.f0 and hence suppresses out-of-focus light. For 1, −1, 2, −2, the filter suppresses the higher orders of diffraction 35.f1, 35.f2, 35.f3, 35.f4 and hence minimizes artifacts.

The approach explained previously for a strip pattern, i.e., n=5, can very easily be extended to a 2-D point illumination pattern, too, for example an illumination pattern that can be generated from five partial beams which are arranged in the illumination pupil in the form of the five spots of the spots of a die. If $a_0$ denotes the intensity of the central beam and a denotes the intensity of the remaining beams, then the following is obtained:

$$I(x, y, z) = a_0^2/2 + 2*a^2 + 2*a^2 \cos(2*\hat{k}_y y + \varphi_y) + \quad (13)$$
$$2*aa_0 \cos(\hat{k}_x x + \hat{k}_y y + \varphi_{-20}) * \cos((\hat{k} - \hat{k}_z)z - \varphi_1) +$$
$$2*a^2 \cos(2*\hat{k}_x x + \varphi_x) + a^2 \cos(2*\hat{k}_x x + 2*\hat{k}_y y + \varphi_{-22}) +$$
$$2*aa_0 \cos(\hat{k}_x x - \hat{k}_y y + \varphi_{-10}) * \cos((\hat{k} - \hat{k}_z)z - \varphi_0) +$$
$$a^2 \cos(2*\hat{k}_x x - 2*\hat{k}_y y + \varphi_{-11})$$

This illumination pattern leads to n=13. Otherwise, the mathematics for the algorithm described above for the case n=5 applies analogously, with the variables $\varphi_x$, $\varphi_y$ individualizing the displacement positions.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method of image evaluation when performing SIM microscopy on a sample, comprising:
   A) providing n raw images of the sample, which were each generated by illuminating the sample with an individually positioned SIM illumination pattern and imaging the sample in accordance with a point spread function,
   B) providing n illumination pattern functions, which each describe one of the individually positioned SIM illumination patterns,
   C) providing the point spread function, and
   D) carrying out an iteration method, which comprises following iteration steps a) to e) as follows:
   a) providing an estimated image of the sample,
   b) generating simulated raw images, in each case by image processing of the estimated image using the point spread function and one of the n illumination pattern functions such that n simulated raw images are obtained,
   c) assigning each of the n simulated raw images to that of the n provided raw images which was generated by the illumination pattern that corresponds to the illumination pattern function used to generate the simulated raw image, and calculating n correction raw images by the comparison of each provided raw image with the simulated raw image assigned thereto, d) generating a correction image by combining image processing of the n correction raw images using the point spread function and the n illumination pattern functions, and e) reconstructing the estimated image of the sample by means of the correction image and using the corrected estimated image of the sample as the estimated image of the sample in iteration step a) in the next run through the iteration, carrying out a filtering step in a plurality of implementations of iteration step d), said filtering step attenuating or suppressing a signal component corresponding to an order of diffraction of the illumination pattern.

2. The method as claimed in claim 1, wherein the filtering step attenuates or suppresses the signal component which corresponds to the zero order of diffraction of the illumination pattern.

3. The method as claimed in claim 1, wherein the filtering step attenuates or suppresses signal components which correspond to higher orders of diffraction of the illumination pattern.

4. The method as claimed in claim 1, wherein the filtering step attenuates or suppresses signal components corresponding to a plurality of orders of diffraction of the illumination pattern.

5. The method as claimed in claim 4, wherein, for the filtering step, a degree of the suppression and/or a frequency bandwidth of the suppression are chosen differently for the orders of diffraction.

6. The method as claimed in claim 5, wherein the degree of suppression and/or the frequency bandwidth is greater for the zero order of diffraction than for higher orders of diffraction.

7. The method as claimed in claim 1, wherein, in iteration step b), the generation of the simulated raw images in each case comprises a convolution of the estimated image with the point spread function and one of the n illumination pattern functions and wherein, in iteration step d), the reconstruction of the correction image comprises a deconvolution of the n correction raw images using the point spread function and the n illumination pattern functions, wherein the filtering is carried out in the deconvolution.

8. The method as claimed in claim 1, wherein the iteration method comprises a maximum likelihood estimation.

9. The method as claimed in claim 1, wherein, in iteration step d), the assignment is implemented on the basis of a phase angle and—to the extent this is present—a relative rotational position of the illumination pattern.

10. A method for performing SIM microscopy on a sample, wherein a microscope whose imaging properties are characterized by a point spread function is used and the method further comprises:

A) providing n raw images of the sample, which were each generated by illuminating the sample with an individually positioned SIM illumination pattern and imaging the sample in accordance with a point spread function, B) providing n illumination pattern functions, which each describe one of the individually positioned SIM illumination patterns, C) providing the point spread function and D) carrying out an iteration method, which comprises following iteration steps a) to e):

a) providing an estimated image of the sample, b) generating simulated raw images, in each case by image processing of the estimated image using the point spread function and one of the n illumination pattern functions such that n simulated raw images are obtained, c) assigning each of the n simulated raw images to that of the n provided raw images which was generated by the illumination pattern that corresponds to the illumination pattern function used to generate the simulated raw image, and calculating n correction raw images by the comparison of each provided raw image with the simulated raw image assigned thereto, d) generating a correction image by combining image processing of the n correction raw images using the point spread function and the n illumination pattern functions, and e) reconstructing the estimated image of the sample by means of the correction image and using the corrected estimated image of the sample as the estimated image of the sample in iteration step a) in the next run through the iteration, carrying out a filtering step in a plurality of implementations of iteration step d), said filtering step attenuating or suppressing a signal component corresponding to an order of diffraction of the illumination pattern, and providing the n raw images of the sample each by illuminating the sample with one of the individually positioned SIM illumination patterns and imaging the sample by means of the microscope.

11. A computer program stored on a non-transitory computer readable storage device comprising commands which, when the program is executed by a computer, cause the latter to read n raw images of a sample which were each generated by illuminating the sample with an individually positioned SIM illumination pattern and imaging the sample in accordance with a point spread function, n illumination pattern functions, which each describe one of the individually positioned SIM illumination patterns, and the point spread function, and to carry out an iteration method, which comprises following iteration steps a) to e):

a) providing an estimated image of the sample, b) generating simulated raw images, in each case by image processing of the estimated image using the point spread function and one of the n illumination pattern functions such that n simulated raw images are obtained, c) assigning each of the n simulated raw images to that of the n provided raw images which was generated by the illumination pattern that corresponds to the illumination pattern function used to generate the simulated raw image, and calculating n correction raw images by the comparison of each provided raw image with the simulated raw image assigned thereto, d) generating a correction image by combining image processing of the n correction raw images using the point spread function and the n illumination pattern functions, and e) reconstructing the estimated image of the sample by means of the correction image and using the corrected estimated image of the sample as the estimated image of the sample in iteration step a) in the next run through the iteration wherein the commands cause the computer to carry out a filtering step in a plurality of implementations of iteration step d), said filtering step attenuating or suppressing a signal component corresponding to an order of diffraction of the illumination pattern.

12. A non-transitory computer readable storage device, on which a computer program is stored, wherein the computer program comprises commands which, when the program is executed by a computer, cause the latter to read n raw images of a sample, which were each generated by illuminating the sample with an individually positioned SIM illumination pattern and imaging the sample in accordance with a point spread function, n illumination pattern functions, which each describe one of the individually positioned SIM illumination patterns, and the point spread function, and to carry out an iteration method, which comprises following iteration steps a) to e):
   a) providing an estimated image of the sample,
   b) generating simulated raw images, in each case by image processing of the estimated image using the point spread function and one of the n illumination pattern functions such that n simulated raw images are obtained,
   c) assigning each of the n simulated raw images to that of the n provided raw images which was generated by the illumination pattern that corresponds to the illumination pattern function used to generate the simulated raw image, and calculating n correction raw images by the comparison of each provided raw image with the simulated raw image assigned thereto,
   d) generating a correction image by combining image processing of the n correction raw images using the point spread function and the n illumination pattern functions, and
   e) reconstructing the estimated image of the sample by means of the correction image and using the corrected estimated image of the sample as the estimated image of the sample in iteration step a) in the next run through the iteration,
   wherein the commands cause the computer to carry out a filtering step in a plurality of implementations of iteration step d), said filtering step attenuating or suppressing a signal component corresponding to an order of diffraction of the illumination pattern.

13. A data processing apparatus, comprising a processor that is configured such that it reads n raw images of a sample, which were each generated by illuminating the sample with an individually positioned SIM illumination pattern and imaging the sample in accordance with a point spread function, n illumination pattern functions, which each describe one of the individually positioned SIM illumination patterns, and the point spread function, and that it carries out an iteration method, which comprises following iteration steps a) to e):
   a) providing an estimated image of the sample,
   b) generating simulated raw images, in each case by image processing of the estimated image using the point spread function and one of the n illumination pattern functions such that n simulated raw images are obtained,
   c) assigning each of the n simulated raw images to that of the n provided raw images which was generated by the illumination pattern that corresponds to the illumination pattern function used to generate the simulated raw image, and calculating n correction raw images by the comparison of each provided raw image with the simulated raw image assigned thereto,
   d) generating a correction image by combining image processing of the n correction raw images using the point spread function and the n illumination pattern functions,
   d1) a filtering step is carried out in a plurality of implementations of iteration step d), said filtering step attenuating or suppressing a signal component corresponding to an order of diffraction of the illumination pattern, and
   e) reconstructing the estimated image of the sample by means of the correction image and using the corrected estimated image of the sample as the estimated image of the sample in iteration step a) in the next run through the iteration,
   wherein the processor is further configured to carry out a filtering step in a plurality of implementations of iteration step d), said filtering step attenuating or suppressing a signal component corresponding to an order of diffraction of the illumination pattern.

* * * * *

UNITED STATES PATENT AND TRADEMARK OFFICE
CERTIFICATE OF CORRECTION

| | |
|---|---|
| PATENT NO. | : 11,954,831 B2 |
| APPLICATION NO. | : 17/467912 |
| DATED | : April 9, 2024 |
| INVENTOR(S) | : Ingo Kleppe, Yauheni Novikau and Lutz Schaefer |

It is certified that error appears in the above-identified patent and that said Letters Patent is hereby corrected as shown below:

On the Title Page

On page 2, left column, item (56) the last line:   Now reads: "Blophysical Journal"
Should read: -- Biophysical Journal --

In the Specification

Column 2, Line 18:   Now reads: "(2019):"
Should read -- (2019); --

Column 2, Line 48:   Now reads: "(2019):"
Should read -- (2019); --

Column 2, Line 55:   Now reads: "Betzig."
Should read -- Betzig: --

Column 2, Line 67:   Now reads: "2015:"
Should read -- 2015; --

Column 3, Line 1:   Now reads: "S. By"
Should read -- S. Bv --

Column 3, Line 63:   Now reads: "In this case."
Should read -- In this case, --

Column 8, Line 62:   Now reads: "image evaluation:"
Should read -- image evaluation; --

Signed and Sealed this
Fourth Day of June, 2024

*Katherine Kelly Vidal*
Director of the United States Patent and Trademark Office

CERTIFICATE OF CORRECTION (continued)
U.S. Pat. No. 11,954,831 B2

Column 9, Line 62:   Now reads: "phase images. i.e.,"
                     Should read -- phase images, i.e., --

Column 10, Line 47:  Now reads: "Preferably. Gaussian notch"
                     Should read -- Preferably, Gaussian notch --

Column 14, Line 13:  Now reads: "microscopic imaging."
                     Should read -- microscopic imaging, --

Column 15, Line 7:   Equation 5, 4th Line of the equation, Should read $$-- A_1\{H^f(k_x, k_y, k_z + [\hat{k}_z - \hat{k}])e^{i\varphi_0} + H^f(k_x, k_y, k_z - [\hat{k}_z - \hat{k}])e^{-i\varphi_0}\} --$$

Column 16, Line 5:   Should read -- $(k + j k_g)$ --

Column 16, Line 19:  Now reads: "form"
                     Should read -- for m --

Column 17, Line 22:  Now reads: "Then n"
                     Should read -- The n --

Column 18, Line 20:  Second Line of Equation (13), Should read $$-- 2 * aa_0 \cos(\hat{k}_x x + \hat{k}_y y + \varphi_{-20}) * \cos((\hat{k} - \hat{k}_z)z - \varphi_0) --$$